(12) United States Patent
Lee et al.

(10) Patent No.: US 10,031,379 B2
(45) Date of Patent: Jul. 24, 2018

(54) LIQUID CRYSTAL DISPLAY DEVICE COMPRISING A PIXEL ELECTRODE HAVING A GAP DISPOSED BETWEEN A FINE BRANCH PORTION AND AN OUTER PORTION OF THE PIXEL ELECTRODE

(71) Applicant: Samsung Display Co., Ltd., Yongin-si, Gyeonggi-do (KR)

(72) Inventors: Se Hyun Lee, Seoul (KR); Cheol Shin, Hwaseong-si (KR); Hak Sun Chang, Yongin-si (KR); Ka Eun Kim, Yongin-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 181 days.

(21) Appl. No.: 14/986,192

(22) Filed: Dec. 31, 2015

(65) Prior Publication Data

US 2016/0195781 A1    Jul. 7, 2016

(30) Foreign Application Priority Data

Jan. 5, 2015    (KR) .......................... 10-2015-0000724

(51) Int. Cl.
*G02F 1/1343*    (2006.01)
(52) U.S. Cl.
CPC ............... *G02F 1/134309* (2013.01); *G02F 2001/134318* (2013.01); *G02F 2001/134345* (2013.01)

(58) Field of Classification Search
CPC ............................................ G02F 2001/134318
See application file for complete search history.

(56) References Cited

U.S. PATENT DOCUMENTS

| | | | | |
|---|---|---|---|---|
| 2012/0249940 A1* | 10/2012 | Choi | ................ | G02F 1/133753 349/123 |
| 2012/0281172 A1* | 11/2012 | Park | ................ | G02F 1/133707 349/123 |
| 2013/0083263 A1* | 4/2013 | Kim | ................ | G02F 1/134336 349/38 |
| 2013/0128208 A1* | 5/2013 | Yao | ................ | G02F 1/134309 349/142 |
| 2014/0168582 A1* | 6/2014 | Chang | ............... | G02F 1/134309 349/106 |
| 2014/0267994 A1 | 9/2014 | Ryu et al. | | |

FOREIGN PATENT DOCUMENTS

| | | |
|---|---|---|
| KR | 10-2013-0101325 A | 9/2013 |
| KR | 10-2014-0051872 A | 5/2014 |
| KR | 10-2014-0053406 A | 5/2014 |

\* cited by examiner

*Primary Examiner* — Paul Lee
(74) *Attorney, Agent, or Firm* — Innovation Counsel LLP

(57) ABSTRACT

A liquid crystal display device includes: a first substrate; a pixel electrode formed on the first substrate; a second substrate corresponding to the first substrate; and a common electrode formed on the second substrate. The pixel electrode includes: a central electrode, an outer portion connected to the central electrode and extending along an edge of the pixel electrode; and a fine branch portion extending from a side of the central electrode and spaced apart from the outer portion, wherein a cross-shaped opening is formed in the common electrode.

18 Claims, 18 Drawing Sheets

LIQUID CRYSTAL DISPLAY DEVICE COMPRISING A PIXEL ELECTRODE HAVING A GAP DISPOSED BETWEEN A FINE BRANCH PORTION AND AN OUTER PORTION OF THE PIXEL ELECTRODE

CROSS-REFERENCE TO RELATED APPLICATION

This application claims priority to, and the benefit of, Korean Patent Application No. 10-2015-0000724 filed in the Korean Intellectual Property Office on Jan. 5, 2015, the entire contents of which are incorporated herein by reference.

BACKGROUND

(a) Field

Embodiments of the present invention relate generally to flat panel displays. More specifically, embodiments of the present invention relate to liquid crystal display devices with improved lateral viewing characteristics and transmittance.

(b) Description of the Related Art

A liquid crystal display device is one type of flat panel display device that has seen widespread recent adoption. It typically includes two display panels on which field generating electrodes such as a pixel electrode and a common electrode are formed, as well as a liquid crystal layer interposed between the two display panels. In a liquid crystal display device, a voltage is applied to the field generating electrodes so as to apply an electric field to the liquid crystal layer and to thereby determine a direction of liquid crystal molecules, so that the liquid crystal display device displays an image by controlling polarization of incident light.

Among liquid crystal display devices, a vertically aligned mode liquid crystal display device, in which liquid crystal molecules are aligned such that a long axis of the liquid crystal molecules is perpendicular to a display panel while no electrical field is applied, has been developed. In the vertically aligned mode liquid crystal display device, it is desirable to secure a wide angle of view, and to this end, fine slits are often cut in the field generating electrodes. Cutout portions and protrusions determine a tilt direction of liquid crystals, and thus, an angle of view may be increased by inducing tilt directions of liquid crystal molecules in various directions by appropriately arranging the cutout portions and protrusions.

In a method in which a plurality of branch electrodes are formed by forming fine slits in a pixel electrode, a response speed of liquid crystal molecules is degraded due to the relationship between the liquid crystal molecules and other liquid crystal control forces besides the fine slits of the liquid crystal molecules. Thus, undesired texture can be displayed for a predetermined period of time.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device having improved lateral viewability and improved transmittance.

An exemplary embodiment of the present invention provides a liquid crystal display device including: a first substrate; a pixel electrode formed on the first substrate; a second substrate corresponding to the first substrate; and a common electrode formed on the second substrate. The pixel electrode includes: a central electrode, an outer portion connected to the central electrode and extending along an edge of the pixel electrode; and a fine branch portion extending from a side of the central electrode and spaced apart from the outer portion, wherein a cross-shaped opening is formed in the common electrode.

The central electrode may have a rhombus shape, and the central electrode may be connected to the outer portion directly or via an extension of the central electrode.

A width of the outer portion may be from 1 μm to 4 μm.

A distance between an edge of the outer portion and an edge of the fine branch portion may be from 1 μm to 4 μm.

A sum of a width of the outer portion and a distance between an edge of the outer portion and an edge of the fine branch portion may be from 2 μm to 7.5 μm.

The liquid crystal display device may further include: a gate line formed on the first substrate; and an insulating layer formed on the gate line, wherein the pixel electrode includes a first sub-pixel electrode formed in a pixel region on one side of the gate line, and a second sub-pixel electrode formed in a pixel region on an opposite side of the gate line.

The first sub-pixel electrode and the second sub-pixel electrode may be arranged to receive differing voltages.

The common electrode may include a cross-shaped opening and a central opening formed at a center of the cross-shaped opening.

The fine branch portion may extend in a diagonal direction.

The fine branch portion may extend at an angle from 80 degrees to 100 degrees with respect to an edge of the central electrode.

Another exemplary embodiment of the present invention provides a liquid crystal display device including: a first substrate, a pixel electrode formed on the first substrate, a second substrate corresponding to the first substrate, and a common electrode formed on the second substrate. The pixel electrode includes a cross-shaped stem portion, a plurality of fine branch portions extending from the stem portion in four diagonal directions, and an outer portion having a rectangular shape, formed at an edge of the pixel electrode, and spaced apart from the fine branch portions.

The common electrode may formed with no opening therein.

A width of the outer portion may be from 1 μm to 4 μm.

A distance between an edge of the outer portion and an edge of the fine branch portion may be from 1 μm to 4 μm.

A sum of a width of the outer portion and a distance between an edge of the outer portion and an edge of the fine branch portion may be from 2 μm to 7.5 μm.

The liquid crystal display device may further include: a gate line formed on the first substrate; and an insulating layer formed on the gate line. The pixel electrode includes a first sub-pixel electrode formed in a pixel region on one side of the gate line, and a second sub-pixel electrode formed in a pixel region on an opposite side of the gate line.

The first sub-pixel electrode and the second sub-pixel electrode may be arranged to receive differing voltages.

The fine branch portion may extend at an angle from 40 degrees to 50 degrees with respect to a stem portion of the cross-shaped stem portion.

As described above, according to a liquid crystal display device of an exemplary embodiment of the present invention, as the pixel electrode includes a fine branch portion and an outer portion that is spaced apart from the fine branch portion, lateral viewability of the liquid crystal display device may be improved, and liquid crystal control force at an edge of the pixel electrode may be improved to thereby improve transmittance.

DETAILED DESCRIPTION OF THE EMBODIMENTS

Figure 1:
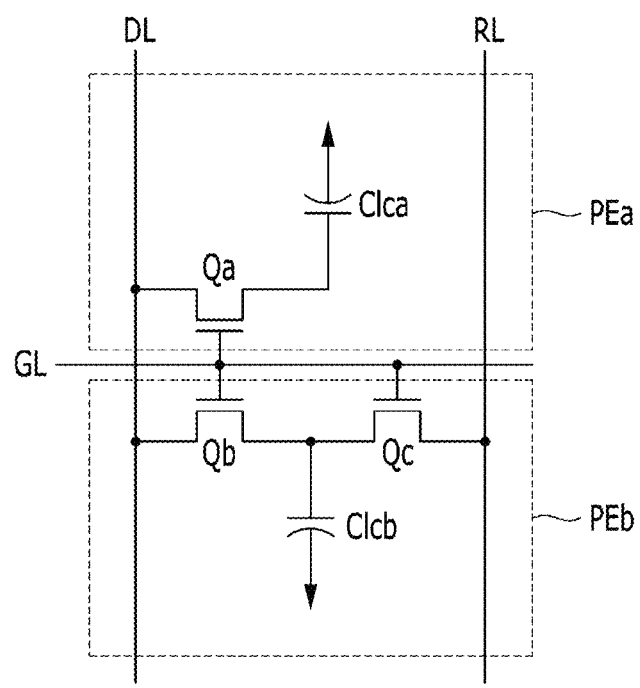
FIG. 1 is a circuit diagram illustrating an equivalent circuit representation of a pixel of a liquid crystal display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The various Figures thus may not be to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate, and may vary. All examples of specific materials and compositions are to be taken as nonlimiting and exemplary only. Other suitable materials and compositions may be used instead.

Hereinafter, a liquid crystal display device according to an exemplary embodiment of the present invention will be described in detail with reference to the accompanying drawings.

First, arrangement of signal lines and pixels of a liquid crystal display device according to an exemplary embodiment of the present invention, and a method of driving the liquid crystal display device, will be described with reference to FIG. 1. FIG. 1 is a circuit diagram illustrating a pixel of a liquid crystal display device according to an exemplary embodiment of the present invention.

Referring to FIG. 1, a pixel PX of the liquid crystal display device according to the present exemplary embodiment includes a gate line GL through which a gate signal is transmitted, a data line DL through which a data signal is transmitted, a plurality of signal lines including a division reference voltage line RL through which a division reference voltage is transmitted. The pixel PX also includes first, second, and third switching elements Qa, Qb, Qc and first and second liquid crystal capacitors Clca and Clcb connected to the plurality of signal lines.

The first and second switching elements Qa and Qb are both connected to the gate line GL and the data line DL, and the third switching element Qc is connected to an output terminal of the second switching element Qb and the division reference voltage line RL.

The first switching element Qa and the second switching element Qb are three-terminal elements such as thin film transistors or the like. Control terminals thereof are connected to the gate line GL, and input terminals thereof are connected to the data line DL. The output terminal of the first switching element Qa is connected to the first liquid crystal capacitor Clca, and the output terminal of the second switching element Qb is connected to input terminals of the second liquid crystal capacitor Clcb and the third switching element Qc.

The third switching element Qc is also a three-terminal element such as a thin film transistor or the like, and a control terminal thereof is connected to the gate line GL, an input terminal thereof is connected to the second liquid crystal capacitor Clcb, and an output terminal thereof is connected to the division reference voltage line RL.

When a gate on signal is applied to the gate line GL, the first switching element Qa, the second switching element Qb, and the third switching element Qc are each turned on. Accordingly, a data voltage applied to the data line DL is applied to a first sub-pixel electrode PEa and a second sub-pixel electrode PEb through the first switching element Qa and the second switching element Qb, respectively. The data voltages applied to the first sub-pixel electrode PEa and the second sub-pixel electrode PEb are substantially identical, and the first liquid crystal capacitor Clca and the second liquid crystal capacitor Clcb are charged to a value corresponding to a difference between a common voltage and a data voltage. At the same time, a voltage applied to the second liquid crystal capacitor Clcb is divided via the third switching element Qc. Accordingly, a value of the voltage applied to the second liquid crystal capacitor Clcb is reduced due to the difference between the common voltage and the division reference voltage. That is, a voltage charged in the first liquid crystal capacitor Clca is higher than the voltage charged in the second liquid crystal capacitor Clcb.

As described above, the voltage charged in the first liquid crystal capacitor Clca and the voltage charged in the second liquid crystal capacitor Clcb are different from each other. As the voltage of the first liquid crystal capacitor Clca and the voltage of the second liquid crystal capacitor Clcb are different from each other, tilt angles of liquid crystal molecules in the first sub-pixel and the second sub-pixel are different, thereby producing differing luminances in the two sub-pixels. Thus, by appropriately adjusting the voltage of the first liquid crystal capacitor Clca and the voltage of the second liquid crystal capacitor Clcb, an image viewed from a side of the display may be close to an image viewed from the front, thereby improving lateral viewability.

According to the illustrated exemplary embodiment, in order to differentiate the voltage of the first liquid crystal capacitor Clca and the voltage of the second liquid crystal capacitor Clcb, the third switching element Qc and the division reference voltage line RL are included. However, according to a liquid crystal display device of another exemplary embodiment of the present invention, the second liquid crystal capacitor Clcb may instead be connected to a step-down capacitor.

In detail, a first terminal of the third switching element Qc can be connected to a step-down gate line, a second terminal can be connected to the second liquid crystal capacitor Clcb, and a third terminal can be connected to a step-down capacitor so as to charge a portion of a charge amount charged in the second liquid crystal capacitor Clcb in the step-down capacitor, thereby differently setting charge voltages of the first liquid crystal capacitor Clca and the second liquid crystal capacitor Clcb.

Also, according to a liquid crystal display device of another exemplary embodiment of the present invention, a first liquid crystal capacitor Clca and a second liquid crystal capacitor Clcb may be connected to different data lines from each other so as to receive different data voltages, thereby setting charge voltages of the first liquid crystal capacitor Clca and a second liquid crystal capacitor Clcb to different values.

In addition, the charge voltages of the first liquid crystal capacitor Clca and a second liquid crystal capacitor Clcb may be differently set by using other various methods.

Hereinafter, a structure of a liquid crystal display device according to the exemplary embodiment illustrated in FIG. 1 will be briefly described with reference to FIGS. 2 through 5.

Figure 2:
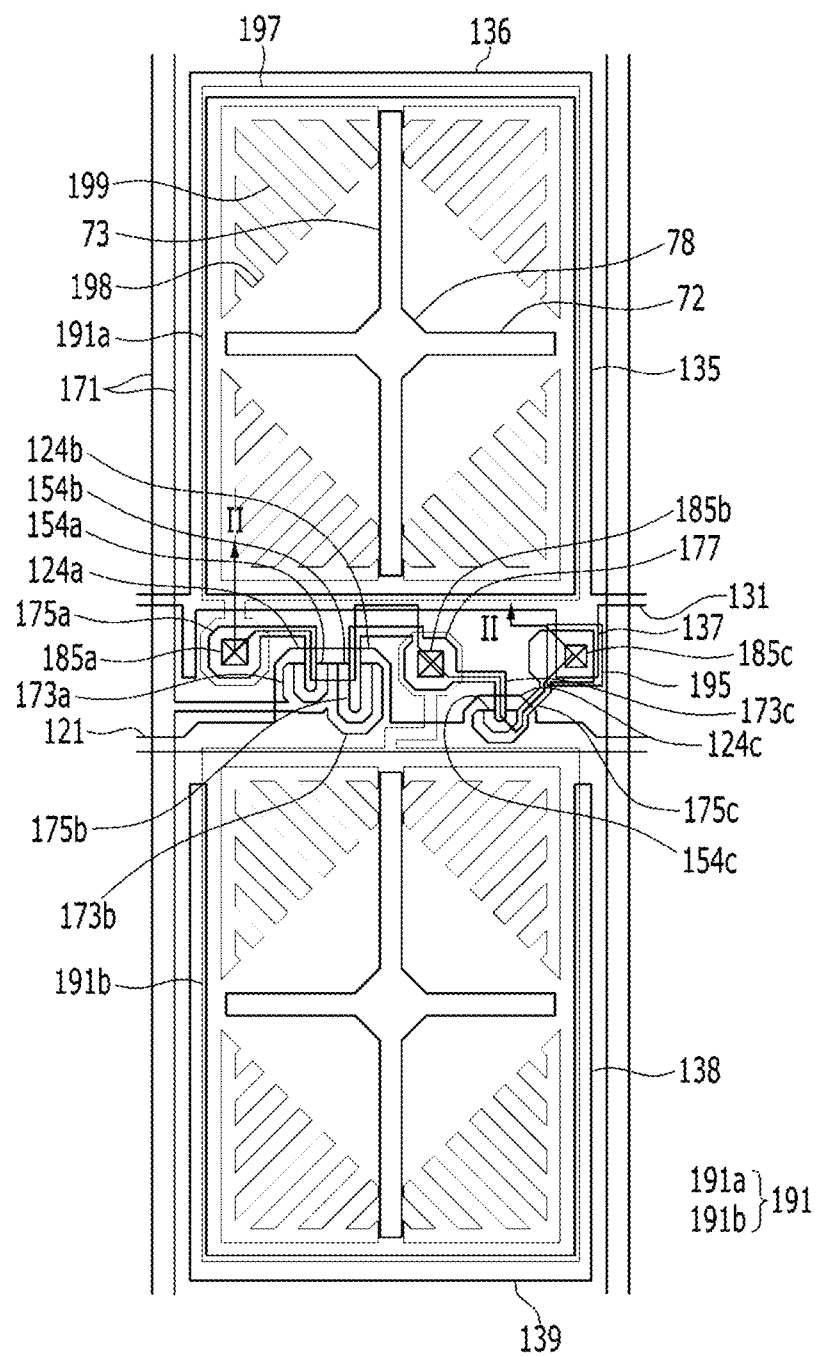
FIG. 2 is a layout view of a pixel of a liquid crystal display device according to an exemplary embodiment of the present invention.
Figure 3:
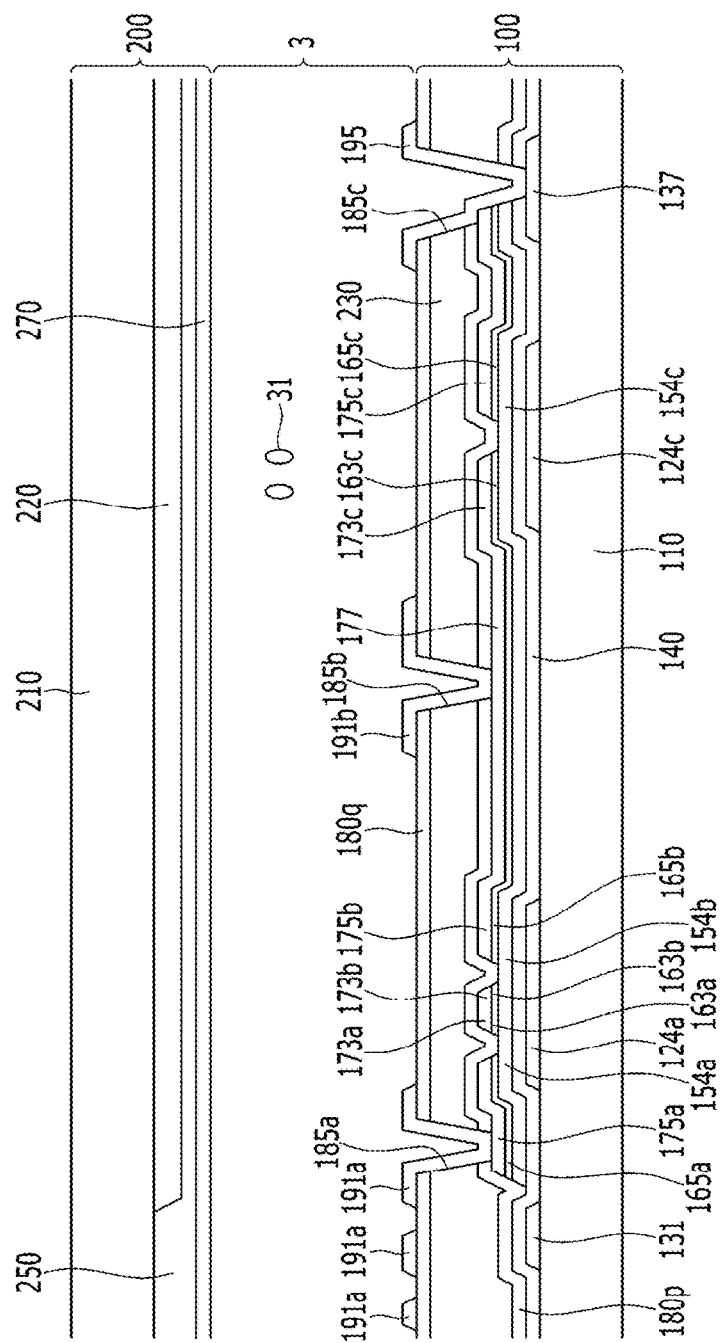
FIG. 3 is a cross-sectional view taken along line III-III of FIG. 2.

FIG. 2 is a layout view of a pixel of a liquid crystal display device according to an exemplary embodiment of the present invention, and FIG. 3 is a cross-sectional view of the liquid crystal display device of FIG. 2 taken along line III-III.

Figure 4:
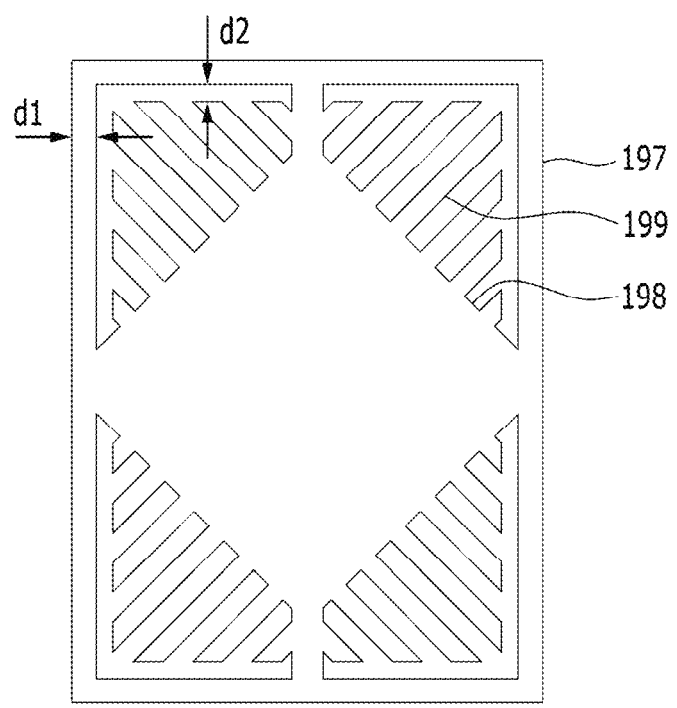
FIG. 4 is a plan view of a region of a pixel electrode of a liquid crystal display device according to an exemplary embodiment of the present invention.
Figure 5:
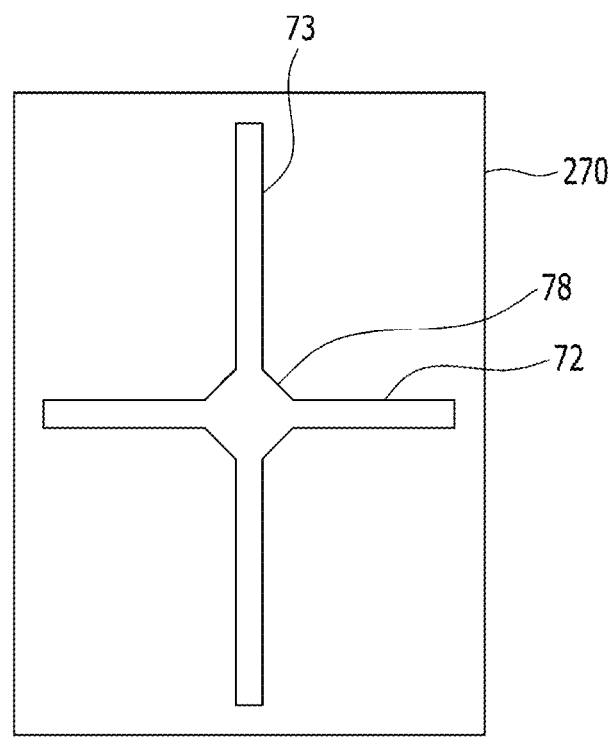
FIG. 5 is a plan view of a common electrode of a liquid crystal display device according to an exemplary embodiment of the present invention.

FIG. 4 is a plan view of a region of a pixel electrode of a liquid crystal display device according to an exemplary embodiment of the present invention, and FIG. 5 is a plan view of a common electrode of a liquid crystal display device according to an exemplary embodiment of the present invention.

First, referring to FIGS. 2 and 3, a liquid crystal display device according to the present exemplary embodiment includes a lower display panel 100 and an upper display panel 200 facing each other, a liquid crystal layer 3 interposed between the two display panels 100 and 200, and a pair of polarizers (not shown) attached to outer surfaces of the display panels 100 and 200.

First, the lower display panel 100 will be described.

A gate conductor including a gate line 121 and a division reference voltage line 131 are formed on an insulation substrate 100 formed of a transparent glass or plastic or the like.

The gate line 121 includes a first gate electrode 124a, a second gate electrode 124b, a third gate electrode 124c, and a broad end portion (not shown) for connection to other layers or to an external driving circuit.

The division reference voltage line 131 includes first storage electrodes 135 and 136, and a reference electrode 137.

Although not connected to the division reference voltage line, second storage electrodes 138 and 139 that overlap a second sub-pixel electrode 191b are disposed.

A gate insulating layer 140 is formed on the gate line 121 and the division reference voltage line 131.

A first semiconductor 154a, a second semiconductor 154b and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor is formed on the ohmic contacts 163a, 165a, 163b, 165b, 163c, and 165c and the gate insulating layer 140. The data conductor includes a plurality of data lines 171 including a first source electrode 173a and a second source electrode 173b, a first drain electrode 175a, a second drain electrode 175b, a third source electrode 173c, and a third drain electrode 175c is formed.

The data conductor and the semiconductors and the ohmic contacts located under the data conductor may be simultaneously formed using a single mask.

The data lines 171 include a broad end portion (not shown) for connection to other layers or to an external driving circuit.

The first gate electrode 124a, the first source electrode 173a, and the first drain electrode 175a form the first thin film transistor (TFT) Qa, along with the first semiconductor 154a. The first semiconductor 154a may be an island-type semiconductor, and a channel of the thin film transistor is formed in the semiconductor 154a between the first source electrode 173a and the first drain electrode 175a.

Similarly, the second gate electrode 124b, the second source electrode 173b, and the second drain electrode 175b form the second thin film transistor Qb along with the second semiconductor 154b, which can also be an island-type semiconductor. A channel is formed in the second semiconductor 154b between the second source electrode 173b and the second drain electrode. Also, the third gate electrode 124c, the third source electrode 173c, and the third drain electrode 175c form the third thin film transistor Qc along with the third semiconductor 154c, which can be an island-type semiconductor. A channel is formed in the third semiconductor 154c between the third source electrode 173c and the third drain electrode 175c.

The second drain electrode 175b is connected to the third source electrode 173c and includes an extension portion 177 that is broadly extended, i.e. an expansion larger than its surrounding portions.

A first passivation layer 180p is formed on the data conductors 171, 173c, 175a, 175b, and 175c and exposed portions of the semiconductors 154a, 154b, and 154c. The first passivation layer 180p may include an inorganic insulating layer such as a silicon nitride or a silicon oxide. The first passivation layer 180p may prevent inflow of a pigment of a color filter into the exposed portions of the semiconductors 154a, 154b, and 154c.

The color filter 230 is formed on the first passivation layer 180p. The color filter 230 extends vertically along two adjacent data lines. A first light blocking member 220 is disposed on the upper display panel 200 over the first passivation layer 180p, an edge of the color filter 230, and the data line 171.

Alternatively, the color filter 230 may be formed on the upper display panel 200 instead of the lower display panel 100.

A second passivation layer 180q is formed on the color filter 230. The second passivation layer 180q may include an inorganic insulating layer such as a silicon nitride or a silicon oxide. The second passivation layer 180q prevents lifting of the color filter 230 and reduces pollution of the liquid crystal layer 3 due to an organic material such as a solvent flowing from the color filter 230, thereby preventing defects such as afterimages which may be generated when a screen is driven.

A first contact hole 185a and a second contact hole 185b, that expose the first drain electrode 175a and the second drain electrode 175b respectively, are formed in the first passivation layer 180p and the second passivation layer 180q.

A third contact hole 185c, that exposes a portion of the reference electrode 137 and a portion of the third drain electrode 175c, is formed in the first passivation layer 180p and the second passivation layer 180q and the gate insulating layer 140. The third contact hole 185c is covered by a connecting member 195.

The connecting member 195 electrically connects the reference electrode 137 and the third drain electrode 175c exposed by the third contact hole 185c.

A plurality of pixel electrodes 191 are formed on the second passivation layer 180q. Each of the pixel electrodes 191 includes a first sub-pixel electrode 191a and a second sub-pixel electrode 191b that are spaced apart from each other with the gate line 121 included therebetween and that are adjacent to each other in a column direction with respect to the gate line 121.

The pixel electrodes 191 may be formed of a transparent material such as indium tin oxide (ITO), indium zinc oxide (IZO) or the like, or a reflective metal such as aluminum, silver, chromium or an alloy thereof.

The first sub-pixel electrode 191a and the second sub-pixel electrode 191b each may be formed as illustrated in FIG. 4.

The first sub-pixel electrode 191a and the second sub-pixel electrode 191b are respectively physically and electrically connected to the first drain electrode 175a and the second drain electrode 175b via the first contact hole 185a and the second contact hole 185b, and receive a data voltage from the first drain electrode 175a and the second drain electrode 175b.

Here, a portion of the data voltage applied to the second drain electrode 175b is divided by the third source electrode 173c so that a voltage applied to the first sub-pixel electrode 191a is greater than a voltage applied to the second sub-pixel electrode 191b.

The first sub-pixel electrode 191a and the second sub-pixel electrode 191b generate an electrical field with the common electrode 270 of the upper display panel 200 so as to determine a direction of liquid crystal molecules of the liquid crystal layer 3 between the two electrodes 191 and 270. Luminance of light that passes through the liquid crystal layer 3 is varied according to a direction of liquid crystal molecules that is determined as described above.

Hereinafter, the upper display panel 200 will be described.

A black matrix 220 is formed on an insulation substrate 210. The black matrix 220 is formed on the upper display panel 220 to correspond to a region of the lower display panel 100 in which the data lines are formed and a region in which transistors or the like are formed.

An overcoat layer 250 is formed on the black matrix 220. The overcoat layer 250 may be omitted.

The common electrode 270 is formed on the overcoat layer 250. An upper alignment layer (not shown) is formed on the common electrode 270. The alignment layer may be a vertical alignment layer.

The liquid crystal layer 3 has negative dielectric anisotropy, and liquid crystal molecules of the liquid crystal layer 3 are aligned such that a long axis of the liquid crystal molecules is perpendicular to surfaces of the two display panels 100 and 200 while no electrical field is present.

Also, while not illustrated, a lower polarizing plate is formed under the lower display panel 100, and an upper polarizing plate is formed on the upper display panel 200. The polarizing plates polarize light incident from a backlight unit (not shown) or the like in a predetermined direction, so that the polarized light falls incident onto the liquid crystal display device. The plates also polarize the light that has transmitted through the liquid crystal display device in a predetermined direction again, so as to emit the polarized light to the outside.

A shape of the pixel electrode of the liquid crystal display device according to an exemplary embodiment of the present invention will be described with reference to FIG. 4. The shape of the pixel electrode is the same for both the first sub-pixel electrode and the second sub-pixel electrode.

Referring to FIG. 4, the pixel electrode includes a central electrode 198, a plurality of fine branch portions 199 extending from sides of the central electrode 198 outward, and an outer portion 197 disposed at an edge of the pixel electrode.

The central electrode 198 may have a rhombus shape.

The plurality of fine branch portions 199 may be oriented at an angle of 45 degrees with respect to a horizontal direction or a vertical direction, or alternatively at an angle of 40 degrees or greater or an angle of 50 degrees or smaller. Also, sides of the central electrode 198 and the fine branch portions 199 may be orthogonal to each other.

The outer portion 197 has a quadrangle shape and is formed at the edge of the pixel electrode.

Each corner of the central electrode 198 is connected to the outer portion 197. The corners of the central electrode 198 may be connected directly to the outer portion 197 or the corners of the central electrode 198 may extend to be connected to the outer portion 197.

As further described below, the outer portion 197 performs the function of offsetting a fringe field that is formed in a vertical or horizontal direction (0, 90, 180, or 270 degree-direction) at the edge of the pixel electrode. By offsetting a fringe field formed in a vertical or horizontal direction, the texture of liquid crystals may be improved near the edge of the pixel electrode.

The outer portion 197 is not connected to the fine branch portions 199 and is spaced apart therefrom by a predetermined distance. That is, a predetermined distance is present between the outer portion 197 and the outer edges of fine branch portions 199, and the distance is marked as d2 in FIG. 4.

As being described later, a width d1 of the outer portion 197 may be from 1 μm to 4 μm.

Also, the distance d2 between the outer portion 197 and the fine branch portions 199 may be from 1 μm to 4 μm.

The measurements are measurements selected to improve control force of liquid crystals and transmittance.

The width of the outer portion 197 and the distance between the outer portion 197 and the fine branch portions 199 will be described in detail later.

Next, the common electrode 270 will be described with reference to FIG. 5.

Openings 72, 73, and 78, which are domain dividing units, are formed in the common electrode 270.

That is, a cross-shaped opening formed of a horizontal opening 72 and a vertical opening 73 crossing the horizontal opening 72 is formed in the common electrode 270, and a central opening 78 located in a center of the cross-shaped opening may be further included in the present exemplary embodiment.

The central opening 78 has a polygonal shape including four straight sides respectively located in the four sub-regions that are formed by the cross-shaped opening, and in the present exemplary embodiment, the central opening 78 has a rhombus shape.

According to a liquid crystal display device of the present invention that includes the pixel electrode 191 and the common electrode 270, the outer portion 197 formed in an outer area of the pixel electrode 191 offsets a fringe field in a 0, 90, 180, or 270 degree-direction to thereby reinforce liquid crystal control force and improve transmittance.

Hereinafter, the effect according to the liquid crystal display device of the present invention will be described by comparing with comparative examples of the present invention.

Figure 6:
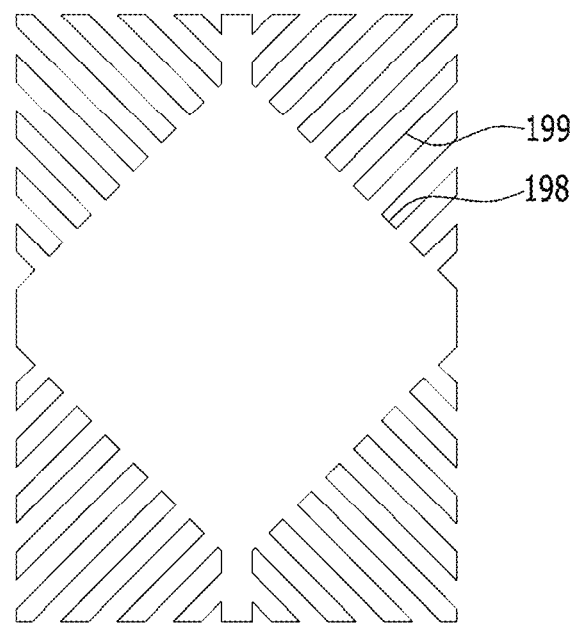
FIG. 6 illustrates a pixel electrode of a liquid crystal display device according to a comparative example of the present invention.

FIG. 6 illustrates a pixel electrode of a liquid crystal display device according to a comparative example of the present invention. Referring to FIG. 6, the liquid crystal display device according to the comparative example of the present invention includes a pixel electrode that includes a central electrode 198 and fine branch portions 199 extending from the central electrode 198, but differs from the liquid crystal display device of the present invention in that an outer portion is not included.

Figure 7:
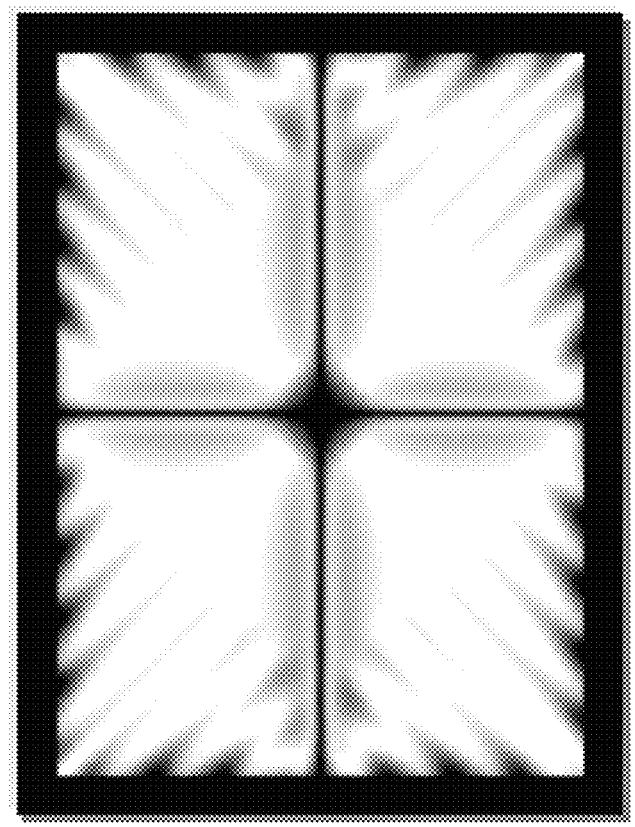
FIG. 7 is an image showing a pixel electrode constructed according to FIG. 6, to which a voltage is actually applied.
Figure 8:
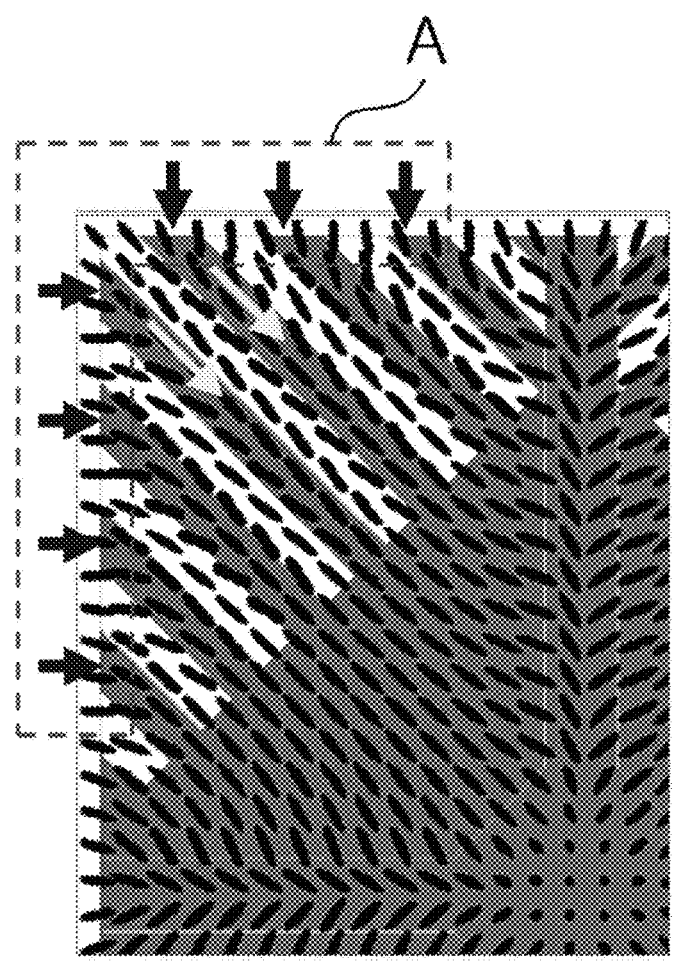
FIG. 8 illustrates an arrangement of liquid crystal molecules of a pixel electrode according to FIG. 6 and a result of simulation of a force applied thereto.

FIG. 7 is an image showing a pixel electrode constructed according to FIG. 6, to which a voltage is actually applied. FIG. 8 illustrates an arrangement of liquid crystal molecules of a pixel electrode of FIG. 6 and a result of simulation of a force applied thereto.

Referring to FIG. 6, the pixel electrode of the liquid crystal display device according to the comparative example of the present invention does not include an outer portion at the edge. Referring to FIG. 7, a side of each edge of the pixel electrode is viewed as being dark. This is because a direction of a fringe field applied to liquid crystal molecules at the edge of the pixel electrode is different from that of a central region of the pixel electrode. Thus, liquid crystal molecules are arranged in a direction different from the center, resulting in texture that is viewed as being dark, as shown in FIG. 7.

Referring to FIG. 8, most regions of the pixel electrode are generate a fringe field oriented in a 45 degree-direction. However, as shown in the region marked as A in FIG. 8, the edge of the pixel electrode generates a fringe field oriented in a 0 degree-direction or a 90 degree-direction as shown by the arrows. This is because, while the direction of the fringe field is 45 degrees due to the fine branch portions in the center region of the pixel electrode, the influence of the fine branch portions is reduced at the edge of the pixel electrode.

Thus, due to the fringe field shown, liquid crystal molecules are arranged in a horizontal or vertical direction in the region A as shown in FIG. 8. As the liquid crystal molecules in region A are arranged in a different direction than those of neighboring regions, portions of the edge of the pixel electrode are viewed as being dark, as shown in FIG. 7.

However, the pixel electrode according to an exemplary embodiment of the present invention includes the outer portion described above, which is spaced apart from the fine branch portions at the edge of the pixel electrode. The fringe field in a vertical or horizontal direction is offset by the outer portion, and accordingly, liquid crystals located at the edge of the pixel electrode are also arranged in the same direction as the central region of the pixel electrode. Thus, dark portions are not generated at the edge of the pixel electrode.

Figure 9:
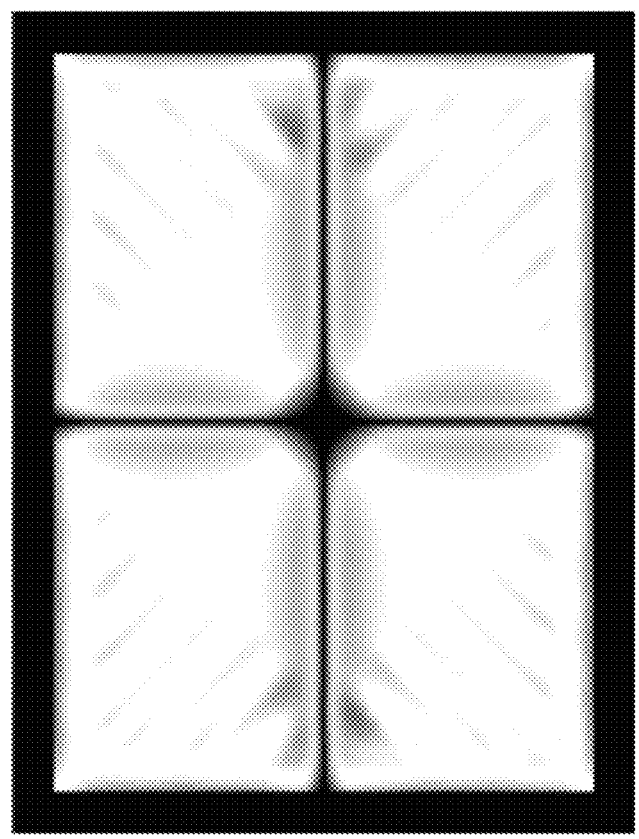
FIG. 9 is an image showing a liquid crystal display device having a pixel electrode structure according to the present invention, to which a voltage is applied.

FIG. 9 is an image showing a liquid crystal display device having a pixel electrode structure according to the present invention, to which a voltage is applied. Referring to FIG. 9, dark portions are not generated at the edge of the pixel electrode in FIG. 9. That is, while dark portions are viewed along regions between the fine branch portions at the edge of the pixel electrode in FIG. 7, a pixel electrode constructed according to an exemplary embodiment of the present invention does not display dark portions at the edge of the pixel electrode, as seen from FIG. 9.

Figure 10:
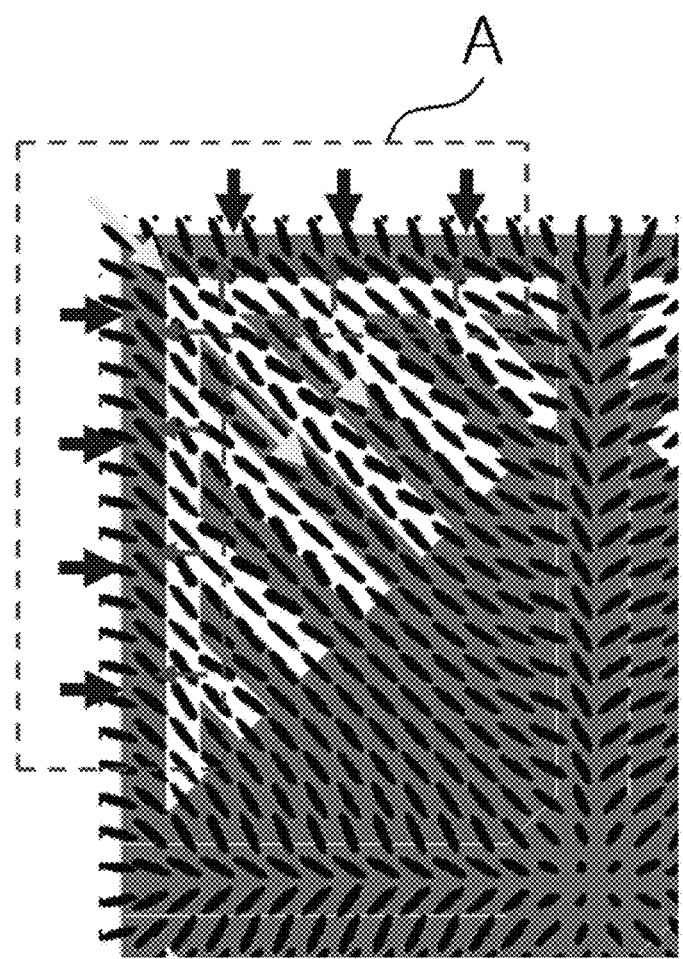
FIG. 10 illustrates an arrangement of liquid crystal molecules for a pixel electrode according to FIG. 4 and a result of simulation of a force applied thereto.

This is because a pixel electrode according to the present invention includes an outer portion spaced apart from the fine branch portions, and the outer portion offsets a vertical- or horizontal-direction fringe field. FIG. 10 illustrates an arrangement of liquid crystal molecules of the pixel electrode of FIG. 4 and a result of simulation performed on a force applied to the liquid crystal molecules of the pixel electrode of FIG. 4.

The effect of offsetting a fringe field in a vertical or horizontal direction in the liquid crystal display device according to the present invention will be described with reference to FIG. 10.

Referring to FIG. 10, as an outer stem portion is formed in an edge region A of the pixel electrode, so that a fringe field (thin arrow) that offsets a previously existing fringe field (thick arrow) in a vertical or horizontal direction is formed.

This is because the fringe field is formed at edges of the outer portion 197, instead of at edges of the fine branch portions 199. Thus, the vertical- and horizontal-direction fringe field is shifted or offset from the edge of portions 199 to edges of the outer portion 197. Accordingly, only fringe fields in diagonal directions (45 degree-direction and 135 degree-direction) are left in the visible area of the pixel electrode. Thus, as shown in FIG. 9, dark portions are not viewed at the edge of the pixel electrode.

Figure 11:
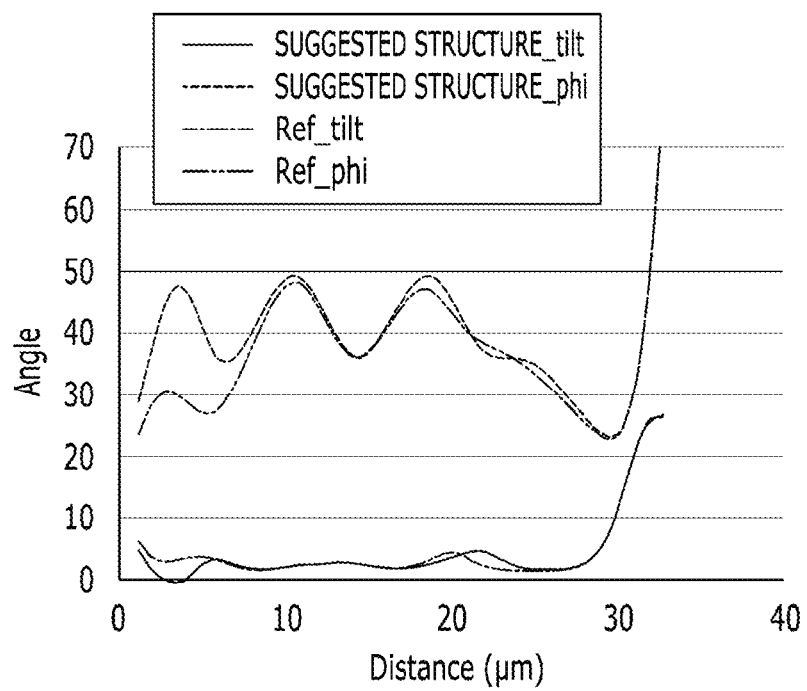
FIG. 11 is a graph showing an alignment angle and a tilting degree of liquid crystal molecules with respect to a pixel electrode according to an exemplary embodiment of the present invention and a comparative example.

FIG. 11 is a graph showing an alignment angle and a tilt degree of liquid crystal molecules for a pixel electrode according to an exemplary embodiment of the present invention and a comparative example.

FIG. 11 shows an alignment angle and a tilt degree of respective liquid crystal molecules according to a distance from the edge of the pixel electrode.

Referring to FIG. 11, according to the liquid crystal display device of an exemplary embodiment of the present invention, an average alignment angle of 45 degrees is maintained over the entire region of the pixel electrode.

However, according to the liquid crystal display device according to the comparative example of the present invention, an alignment angle of liquid crystal molecules is decreased near the edge of the pixel electrode. That is, due to a fringe field oriented in a vertical or horizontal direction, liquid crystal molecules are aligned not at an angle of 45 degrees in the edge region but at a smaller angle than 45 degrees. Thus, dark portions as shown in FIG. 7 are generated.

Also, when referring to FIG. 11, liquid crystals are completely laid down (oriented close to 0 degrees) according to the present invention. However, according to the comparative example of the present invention, liquid crystals are not completely laid down at the edge.

As described above, according to the liquid crystal display device of the exemplary embodiment of the present invention, an outer portion that is spaced apart from the fine branch portions is formed at the edge of the pixel electrode so as to offset a fringe field in a vertical or horizontal direction at the edge and improve transmittance and texture of the liquid crystal display device.

Hereinafter, the effect of varying the width of the outer portion and a distance between the outer portion and the fine branch portions in the pixel electrode of the liquid crystal display device according to an exemplary embodiment of the present invention will be described with reference to FIGS. 12 and 13.

Figure 12:
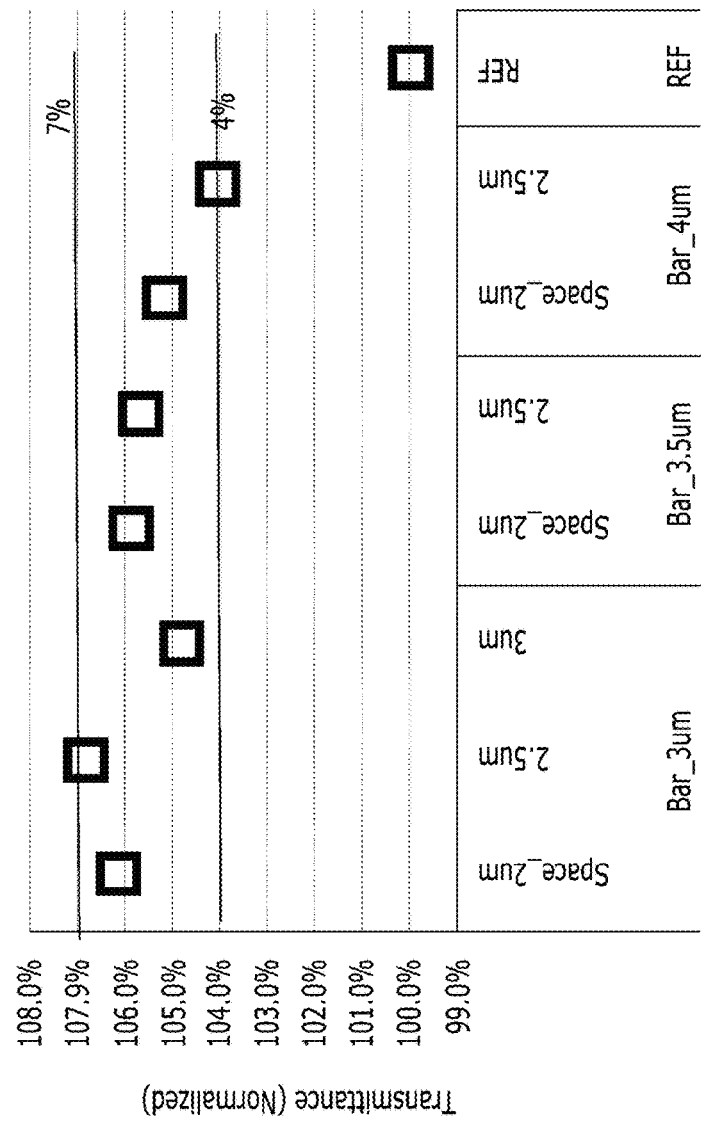
FIG. 12 is a graph showing transmittance according to a width (bar) of an outer portion of a pixel electrode and a distance (space) between fine branch portions and the outer portion of a pixel electrode.

FIG. 12 is a graph showing transmittance according to a width (bar) of the outer portion and a distance (space) between the outer portion and the fine branch portions of the pixel electrode.

Referring to FIG. 12, higher transmittance is exhibited according to the present invention than that in the comparative example (ref) of the present invention in which no outer portion is included.

Also, referring to FIG. 12, the greater the width of the outer portion, the lower transmittance was. Also, if the width of the outer portion is equal, the greater the distance between the outer portion and the fine branch portions, the lower the transmittance was.

As can be seen from the measurement result of FIG. 12, 1 μm to 4 μm was preferable as the width of the outer portion, and also, 1 μm to 4 μm was preferable as the distance between the outer portion and the fine branch portions. Thus, according to the liquid crystal display device of the present invention, the width of the outer portion may be from 1 μm to 4 μm. Also, the distance between the outer portion and the fine branch portion may be from 1 μm to 4 μm.

Also, a sum of the width of the outer portion and the distance between the outer portion and the fine branch portions may be from 2 μm to 7.5 μm.

Figure 13:
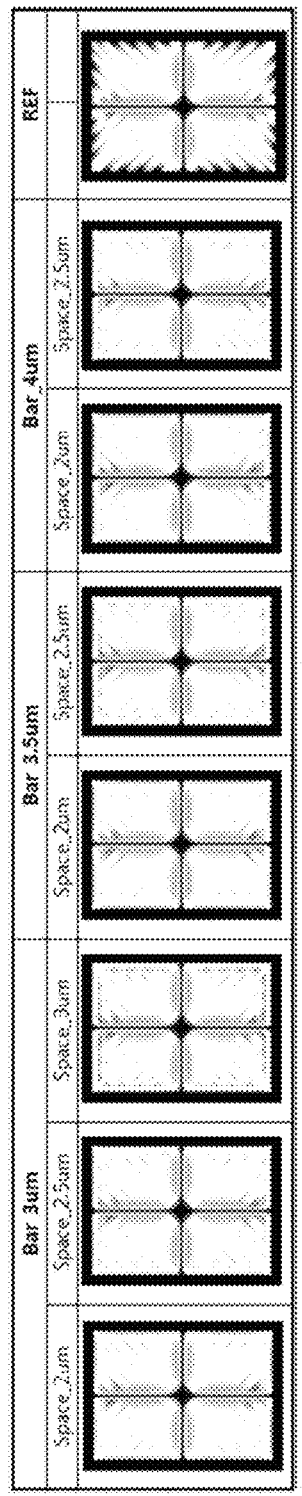
FIG. 13 is an image showing results of voltages applied to pixel electrodes having different configurations.

FIG. 13 is an image showing results of a voltage applied to pixel electrodes having different widths of the outer portion and different distances between the outer portion and the fine branch portions according to the present invention. Referring to FIG. 13, compared to the comparative example (ref), dark portions are not generated at the edge of the pixel electrode according to the present invention.

Also, the shorter the width (bar) of the outer portion of the pixel electrode, the brighter was the liquid crystal display device, and the shorter the distance (space) between the outer portion and the fine branch portions (space), the brighter was the liquid crystal display device. Thus, the experimental result of FIG. 13 also corresponds to the data of FIG. 12.

As described above, the pixel electrode of exemplary embodiments of the present invention includes a central electrode, fine branch portions extending from the central electrode, and an outer portion formed at the edge of the pixel electrode, where the outer portion and the fine branch portions are spaced apart from each other by a predetermined distance. Thus, according to the above-described structure, a fringe field oriented in a vertical or horizontal direction generated at the edge of the pixel electrode may be offset to a location outside the visible area of the pixel, and dark portions generated at the edge of the pixel electrode may thus be eliminated. Accordingly, transmittance is improved.

Figure 14:
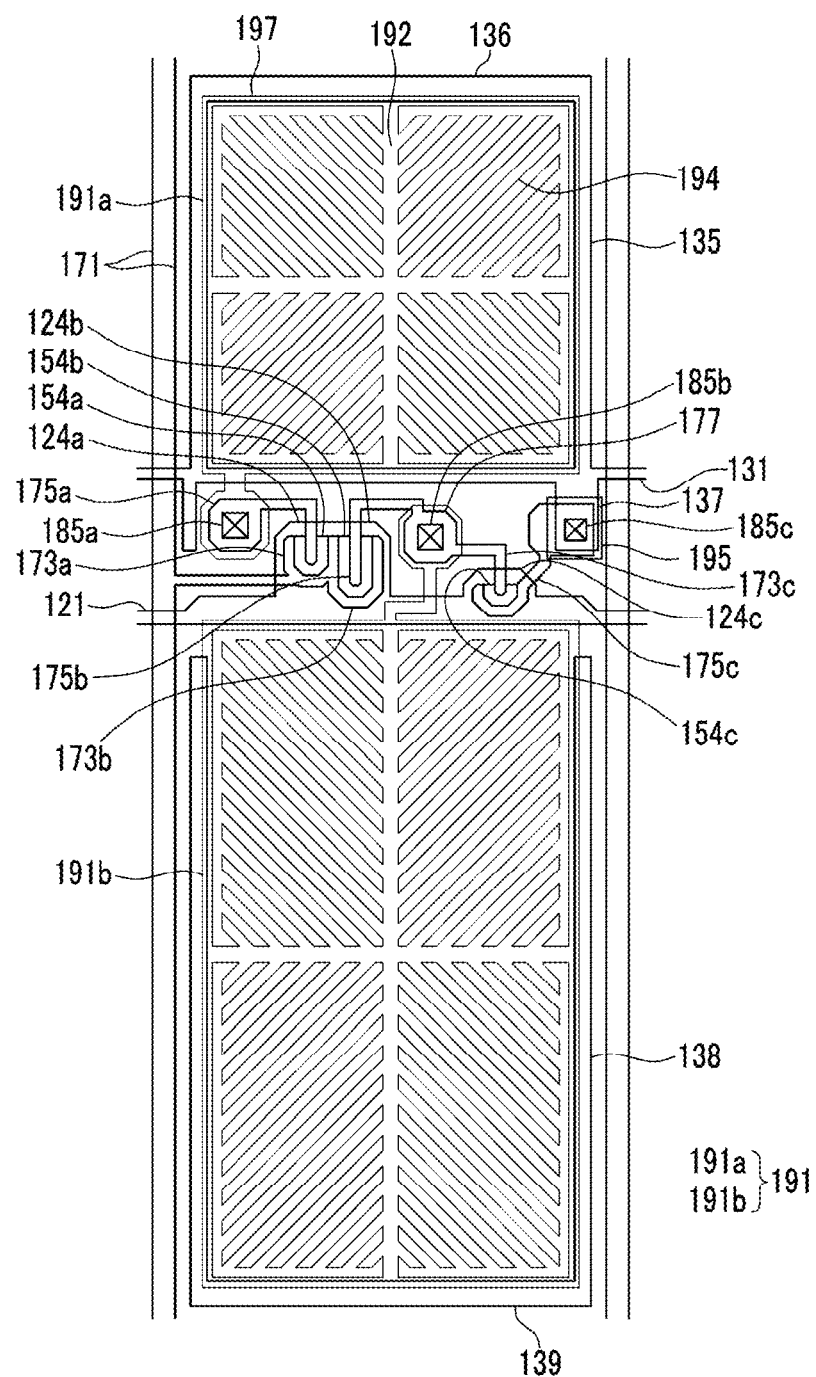
FIG. 14 is a layout view of a liquid crystal display device according to another exemplary embodiment of the present invention.
Figure 15:
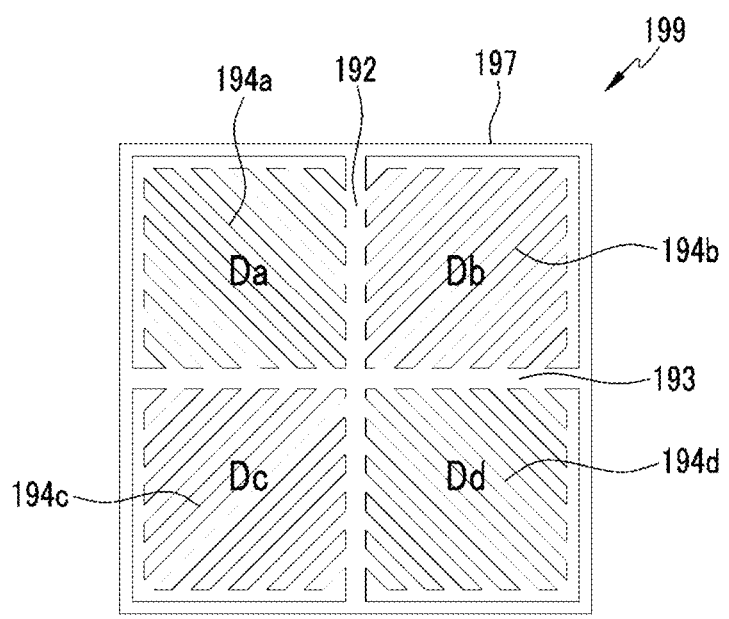
FIG. 15 is a plan view of a pixel electrode of the liquid crystal display device of FIG. 14.

Hereinafter, a liquid crystal display device according to another exemplary embodiment of the present invention will be described with reference to FIG. 14 and FIG. 15. FIG. 14 is a layout view of a liquid crystal display device according to another exemplary embodiment of the present invention. FIG. 15 is a separate view of a pixel electrode of the liquid crystal display device of FIG. 14.

Referring to FIGS. 14 and 15, most constituent elements of the liquid crystal display device according to the present exemplary embodiment are similar to those of the liquid crystal display device according to the exemplary embodiment of FIG. 2 except for the shapes of the pixel electrode and the common electrode. Description of like constituent elements will be omitted.

However, in the liquid crystal display device of FIG. 14, the common electrode (not shown) is a continuous and unbroken plate in which no opening is formed. That is, the common electrode is formed as a single unbroken plate covering the entire pixel area, with no opening formed therein.

Also, when referring to FIGS. 14 and 15, the shape of the pixel electrode 191 of the liquid crystal display device according to the present exemplary embodiment of the present invention is different from that of the previous exemplary embodiment.

Referring to FIG. 15, the pixel electrode 191 according to the present invention has an overall quadrangle shape, and includes a cross-shaped stem portion formed of a horizontal stem portion 193 and a vertical stem portion 192 orthogonal to the horizontal stem portion 193. Also, a basic electrode 199 is divided into a first sub-region Da, a second sub-region Db, a third sub-region Dc, and a fourth sub-region Dd by the horizontal stem portion 193 and the vertical branch portion 192, and each of these sub-regions includes a plurality of first fine branch portions 194*a*, a plurality of second fine branch portions 194*b*, a plurality of third fine branch portions 194*c*, and a plurality of fourth fine branch portions 194*d*.

The first fine branch portions 194*a* obliquely extend from the horizontal stem portion 193 or the vertical branch portion 192 toward the upper left side, and the second fine branch portions 194*b* obliquely extend from the horizontal stem portion 193 or the vertical branch portion 192 toward the upper right side. Also, the third fine branch portions 194*c* obliquely extend from the horizontal stem portion 193 or the vertical branch portion 192 toward the lower left side, and the fourth fine branch portions 194*d* obliquely extend from the horizontal stem portion 193 or the vertical branch portion 192 toward the lower right side.

Also, the outer portion 197 is formed in an outer area of the pixel electrode. The outer portion 197 is connected to the horizontal branch portion 193 and the vertical branch portion 192 of the pixel electrode 191, and is spaced apart from the fine branch portions 194a-d by a predetermined distance.

Here, a width of the outer portion 197 and a distance between the outer portion 197 and the fine branch portions 194a-d are the same as described above. That is, the width of the outer portion 197 may be from 1 μm to 4 μm. Also, the distance between the outer portion 197 and the fine branch portions 194a-d may be from 1 μm to 4 μm.

The outer portion also offsets a vertical or horizontal fringe field in the same manner as the above-described exemplary embodiment. Accordingly, no dark portions may be generated at the edge of the pixel electrode, and transmittance may be improved.

Figure 16:
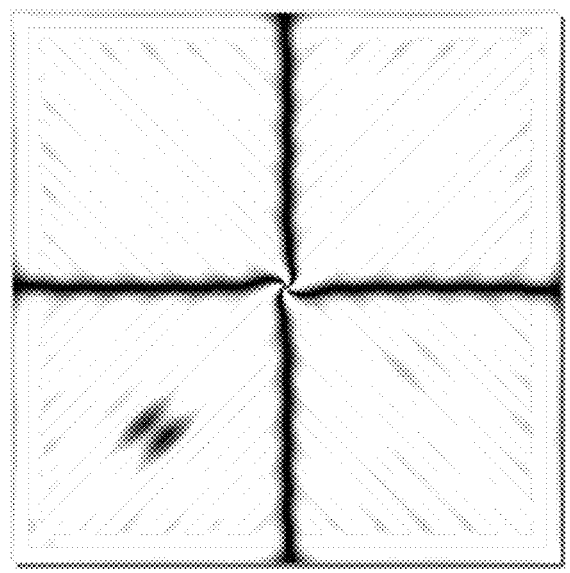
FIG. 16 is an image showing the pixel electrode of a liquid crystal display device constructed according to the exemplary embodiment of FIG. 14, to which a voltage is applied.
Figure 16:
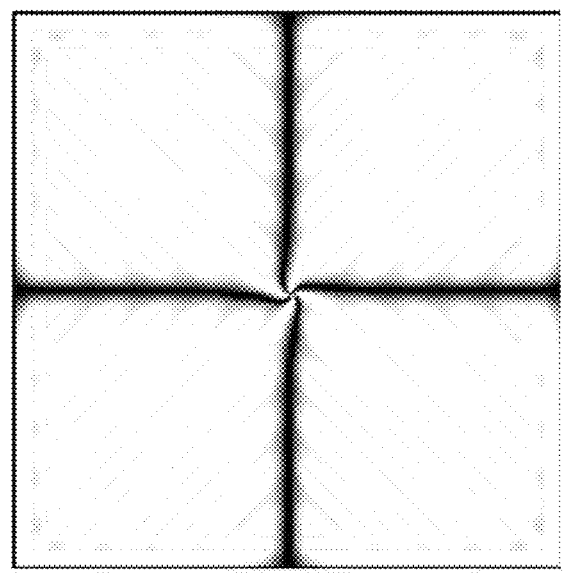

FIG. 16 is an image showing the pixel electrode of a liquid crystal display device according to the exemplary embodiment of FIG. 14, to which a voltage is applied. Referring to FIG. 16, when a voltage is applied, no dark regions are viewed at the edge of the pixel electrode.

Figure 17:
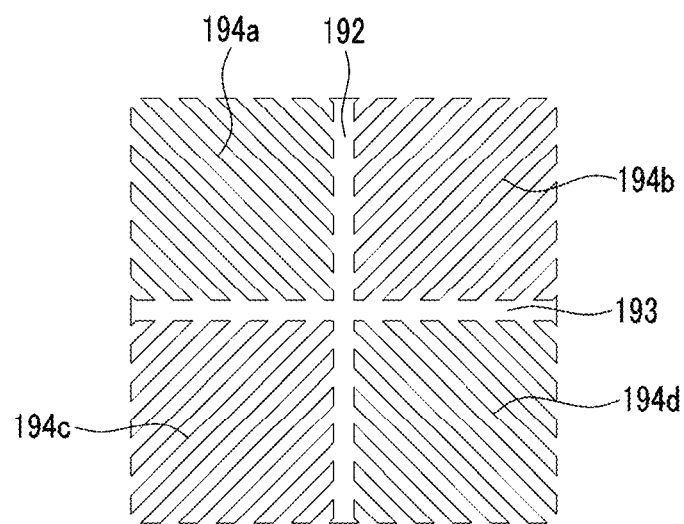
FIG. 17 illustrates a pixel electrode of a liquid crystal display device according to a comparative example of the present invention.

FIG. 17 illustrates a pixel electrode of a liquid crystal display device according to a comparative example of the present invention. Referring to FIG. 17, the shapes of the cross-shaped stem portion and the fine branch portions of the pixel electrode according to the comparative example of the present invention are the same as those of the exemplary embodiment of the present invention, except that an outer portion spaced apart from the fine branch portions is not formed in an outer area of the pixel electrode.

Accordingly, a horizontal or vertical fringe field is formed at the edge of the pixel electrode, and as an alignment direction of liquid crystals at the edge is different from an alignment direction of liquid crystals in a center, the edge is viewed as being dark.

Figure 18:
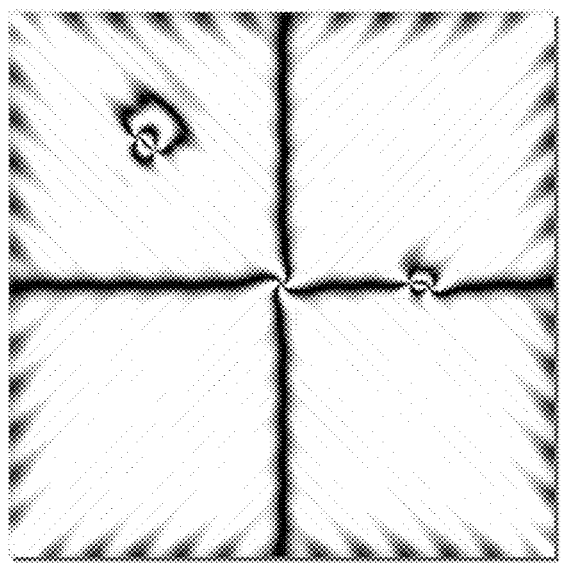
FIG. 18 is an image showing the pixel electrode of a liquid crystal display device constructed according to the comparative example of the present invention, to which a voltage is applied.
Figure 18:
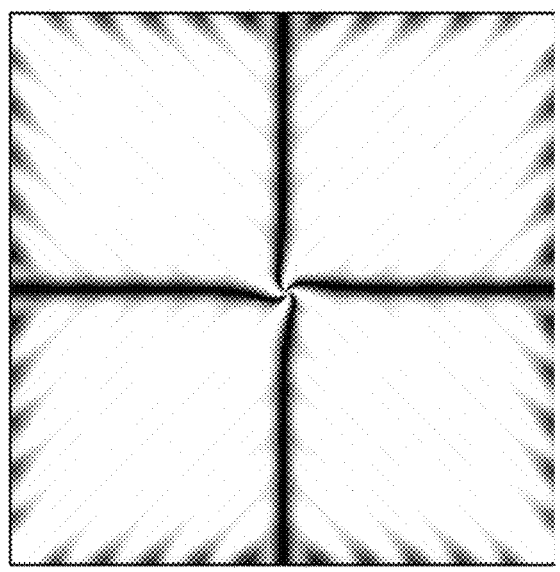

FIG. 18 is an image showing the pixel electrode of a liquid crystal display device according to the comparative example of the present invention, to which a voltage is applied. As shown in FIG. 18, the edge of the pixel electrode is viewed as being dark. This is because of a fringe field applied in a horizontal direction or a vertical direction at the edge of the pixel electrode as described above.

However, as shown in FIG. 15, according to the liquid crystal display device according to the present exemplary embodiment of the present invention, as the outer portion is formed at the edge of the pixel electrode and the outer portion is spaced apart from the fine branch portions to offset a horizontal or vertical fringe field, dark portions are not generated at the edge of the pixel electrode. As above, this is illustrated in FIG. 16.

Also, in all of the above-described exemplary embodiments, as the fine slits are formed in different directions from one another so as to align liquid crystals in four directions, even when the liquid crystal display device is viewed from a lateral side, the head, body, and tail of the liquid crystals are viewed evenly, and thus lateral viewability of the liquid crystal display device may be improved.

As described above, according to a liquid crystal display device of the present invention, as the pixel electrode includes fine branch portions diagonally extending in different directions, as well as an outer portion that is spaced apart from the fine branch portions and formed in an outer area of the pixel electrode, a fringe field at the edge of the pixel electrode is offset or effectively moved from the edge of the fine branch portions to the outer edge of the outer portion, so that dark regions at the edge of the pixel electrode appear outside the visible area of the pixel and are thus effectively reduced or eliminated. Thus, not only lateral viewability of the liquid crystal display device is improved but transmittance thereof is also improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

| <Description of symbols> | |
|---|---|
| GL, 121: gate line | RL, 131: division reference voltage line |
| DL, 171: data line | Clca, Clab: liquid crystal capacitor |
| Qa, Qb, Qc: switching element (thin film transistor) | |
| 110, 210: substrate | 124a, 124b, 124c: gate electrode |
| 140: gate insulating layer | 154a, 154b, 154c, 157: semiconductor |
| 163a, 165a, 163b, 165b, 163c, 165c: ohmic contact | |
| 173a, 173b, 173c: source electrode | 175a, 175b, 175c: drain electrode |
| 180p, 180q: passivation layer | 191a, 191b: sub-pixel electrode |
| 220: black matrix | 230: color filter |
| 198: central electrode | 199: fine branch portion |
| 197: outer portion | 192: vertical branch portion |
| 193: horizontal branch portion | 194: fine branch portion |
| 270: common electrode | 72, 73, 78: opening |

What is claimed is:

1. A liquid crystal display device comprising:
a first substrate;
a pixel electrode formed on the first substrate;
a second substrate corresponding to the first substrate; and
a common electrode formed on the second substrate,
wherein the pixel electrode includes:
a central electrode,
an outer portion connected to the central electrode and extending along an edge of the pixel electrode; and
a fine branch portion extending from a side of the central electrode and spaced apart from the outer portion,
wherein a gap is disposed between the fine branch portion and the outer portion,
wherein a cross-shaped opening is formed in the common electrode, and
wherein the outer portion is not connected to the edge of the fine branch portion.

2. The liquid crystal display device of claim 1, wherein:
the central electrode has a rhombus shape, and
the central electrode is connected to the outer portion directly or via an extension of the central electrode.

3. The liquid crystal display device of claim 1, wherein:
a width of the outer portion is from 1 μm to 4 μm.

4. The liquid crystal display device of claim 1, wherein:
a gap distance between an edge of the outer portion and an edge of the fine branch portion is from 1 μm to 4 μm.

5. The liquid crystal display device of claim 1, wherein:
a sum of a width of the outer portion and a distance between an edge of the outer portion and an edge of the fine branch portion is from 2 μm to 7.5 μm.

6. The liquid crystal display device of claim 1, further comprising:
a gate line formed on the first substrate; and
an insulating layer formed on the gate line,
wherein the pixel electrode includes a first sub-pixel electrode formed in a pixel region on one side of the gate line, and a second sub-pixel electrode formed in a pixel region on an opposite side of the gate line.

7. The liquid crystal display device of claim 6, wherein: the first sub-pixel electrode and the second sub-pixel electrode are arranged to receive differing voltages.

8. The liquid crystal display device of claim 1, wherein: the common electrode includes a cross-shaped opening and a central opening formed at a center of the cross-shaped opening.

9. The liquid crystal display device of claim 1, wherein: the fine branch portion extends in a diagonal direction.

10. The liquid crystal display device of claim 9, wherein: the fine branch portion extends at an angle from 80 degrees to 100 degrees with respect to an edge of the central electrode.

11. A liquid crystal display device comprising:
a first substrate,
a pixel electrode formed on the first substrate,
a second substrate corresponding to the first substrate, and
a common electrode formed on the second substrate,
wherein the pixel electrode includes a cross-shaped stem portion, a plurality of fine branch portions extending from the stem portion in four diagonal directions, and
an outer portion having a rectangular shape, formed at an edge of the pixel electrode, and spaced apart from the fine branch portions,
wherein a gap is disposed between the fine branch portion and the outer portion, and wherein the outer portion is not connected to the edge of the fine branch portion.

12. The liquid crystal display device of claim 11, wherein: the common electrode has no opening therein.

13. The liquid crystal display device of claim 11, wherein: a width of the outer portion is from 1 μm to 4 μm.

14. The liquid crystal display device of claim 11, wherein: a gap distance between an edge of the outer portion and an edge of the fine branch portion is from 1 μm to 4 μm.

15. The liquid crystal display device of claim 11, wherein: a sum of a width of the outer portion and a distance between an edge of the outer portion and an edge of the fine branch portion is from 2 μm to 7.5 μm.

16. The liquid crystal display device of claim 11, further comprising:
a gate line formed on the first substrate; and
an insulating layer formed on the gate line,
wherein the pixel electrode includes a first sub-pixel electrode formed in a pixel region on one side of the gate line, and a second sub-pixel electrode formed in a pixel region on an opposite side of the gate line.

17. The liquid crystal display device of claim 16, wherein: the first sub-pixel electrode and the second sub-pixel electrode are arranged to receive differing voltages.

18. The liquid crystal display device of claim 11, wherein: the fine branch portion extends at an angle from 40 degrees to 50 degrees with respect to a stem portion of the cross-shaped stem portion.

* * * * *